(12) United States Patent
Williams

(10) Patent No.: US 9,529,111 B2
(45) Date of Patent: Dec. 27, 2016

(54) WELL DETECTION USING INDUCED MAGNETIC FIELDS

(71) Applicant: HALLIBURTON ENERGY SERVICES INC., Houston, TX (US)

(72) Inventor: Percival Frederick Williams, Cheltenham (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/779,544

(22) PCT Filed: Nov. 12, 2014

(86) PCT No.: PCT/US2014/065171
§ 371 (c)(1),
(2) Date: Sep. 23, 2015

(87) PCT Pub. No.: WO2016/076846
PCT Pub. Date: May 19, 2016

(65) Prior Publication Data
US 2016/0291193 A1    Oct. 6, 2016

(51) Int. Cl.
*G01V 3/26* (2006.01)
(52) U.S. Cl.
CPC ...................... *G01V 3/26* (2013.01)
(58) Field of Classification Search
None
See application file for complete search history.

(56) References Cited

U.S. PATENT DOCUMENTS

| 3,959,648 | A | 5/1976 | Pitts, Jr. et al. |
| 5,883,516 | A | 3/1999 | Van Steenwyk et al. |
| 6,188,221 | B1 | 2/2001 | Van de Kop et al. |
| 6,188,223 | B1 * | 2/2001 | Van Steenwyk ......... G01V 3/20 175/50 |
| 6,227,293 | B1 | 5/2001 | Huffman et al. |
| 6,294,917 | B1 * | 9/2001 | Nichols .................... G01V 3/28 324/339 |
| 6,396,276 | B1 * | 5/2002 | Van Steenwyk ...... E21B 47/122 175/50 |
| 6,469,635 | B1 | 10/2002 | Hudson |
| 7,485,989 | B2 | 2/2009 | Crain et al. |

(Continued)

OTHER PUBLICATIONS

Pascale et al., "Geophysical Mapping of Ground Ice Using a Combination of Capacitive Coupled Resistivity and Ground-Penetrating Radar," Journal of Geophysical Research, vol. 113, F02S90, Apr. 2008, 15 pages.

(Continued)

*Primary Examiner* — Jermele M Hollington
*Assistant Examiner* — Douglas X Rodriguez
(74) *Attorney, Agent, or Firm* — Benjamin Fite; Parker Justiss, P.C.

(57) ABSTRACT

A well detection system includes a signal generator module and a detector module. Signal generator module is coupled to a well structure, and causes the well structure to emit a signal. The emitted signal is measured by the detector module. Based on measurements of the signal, the detector module can determine information pertaining to the source of the emitted signal and can, for example, determine the location of the well structure relative to the detector module.

18 Claims, 9 Drawing Sheets

(56) References Cited

U.S. PATENT DOCUMENTS

| | | | |
|---|---|---|---|
| 7,863,901 B2 | 1/2011 | Seleznev et al. | |
| 8,106,791 B2 | 1/2012 | Thompson et al. | |
| 8,264,229 B2 | 9/2012 | Hansen | |
| 8,427,162 B2* | 4/2013 | Bespalov | E21B 43/2406 324/326 |
| 8,618,803 B2* | 12/2013 | Rodney | G01V 3/26 324/326 |
| 8,731,987 B2* | 5/2014 | Chen | G01V 3/30 702/11 |
| 2004/0239329 A1 | 12/2004 | Haber et al. | |
| 2006/0232138 A1 | 10/2006 | Williams | |
| 2010/0044035 A1 | 2/2010 | Bespalov | |
| 2010/0065329 A1* | 3/2010 | Zientarski | G01V 11/002 175/24 |
| 2010/0191469 A1 | 7/2010 | Mogilatov | |
| 2010/0194396 A1* | 8/2010 | Bryant | G01V 3/04 324/357 |
| 2012/0074946 A1* | 3/2012 | Forgang | G01V 3/24 324/355 |
| 2012/0212351 A1 | 8/2012 | Hu et al. | |
| 2013/0067644 A1 | 3/2013 | Muskovitz | |
| 2013/0213639 A1 | 8/2013 | Bittar et al. | |
| 2014/0002089 A1* | 1/2014 | Wood | G01V 3/20 324/366 |
| 2014/0231139 A1 | 8/2014 | Rozenblit et al. | |
| 2015/0167440 A1* | 6/2015 | Kasevich | E21B 33/124 166/52 |

OTHER PUBLICATIONS

Elam, "New Method Helps to Refine Subsurface Interpretations," World Oil, Jun. 1990, 5 pages.

International Search Report/Written Opinion dated Jul. 23, 2015 issued by Korean Intellectual Property Office, 9 pages.

\* cited by examiner

WELL DETECTION USING INDUCED MAGNETIC FIELDS

TECHNICAL FIELD

This disclosure relates to location wells, and more particularly to methods and systems for locating one well while constructing another.

BACKGROUND

Wells are commonly used to access regions below the earth's surface and to acquire materials from these regions, for instance during the location and extraction of petroleum oil hydrocarbons or gas from an underground location. The construction of wells typically includes drilling a wellbore and constructing a pipe structure within the wellbore. Upon completion, the pipe structure provides access to the underground locations and allows for the transport of materials to the surface.

DETAILED DESCRIPTION

During the construction of a well system, a wellbore is often drilled in proximity to one or more established wells. To ensure that the wellbore is positioned as desired amongst the established wells, a user directs the drilling of the wellbore based on location information provided by a well detection system. In an example implementation, a well detection system includes a signal generator module coupled to a first well structure (e.g., an established well), and a detector module positioned within a second well structure (e.g., on a drilling apparatus within a wellbore under construction). The signal generator module applies pulses of current onto the first well structure, such that a current is induced along the length of the well structure. This current induces corresponding pulses of magnetic field that are detected by the detector module. Based on these detected magnetic field pulses, the well detection system determines the location of the first well structure relative to the second structure and displays the location information to the user. Based on this location information, the user directs the drilling of the wellbore accordingly.

An example signal generator module for applying pulses of current to a well includes a power supply, a switch module, a first set of capacitors, and a second set of capacitors. The switch module selectively couples the capacitors to the power supply and a well (e.g., an established well), such at any given moment, one of the sets of capacitors is being charged by the power supply, while the other set of capacitors is discharging electrical current into the well. In this manner, an alternating series of current pulses is applied to the well, causing the well to emit an alternating series of magnetic field pulses.

Figure 1A:
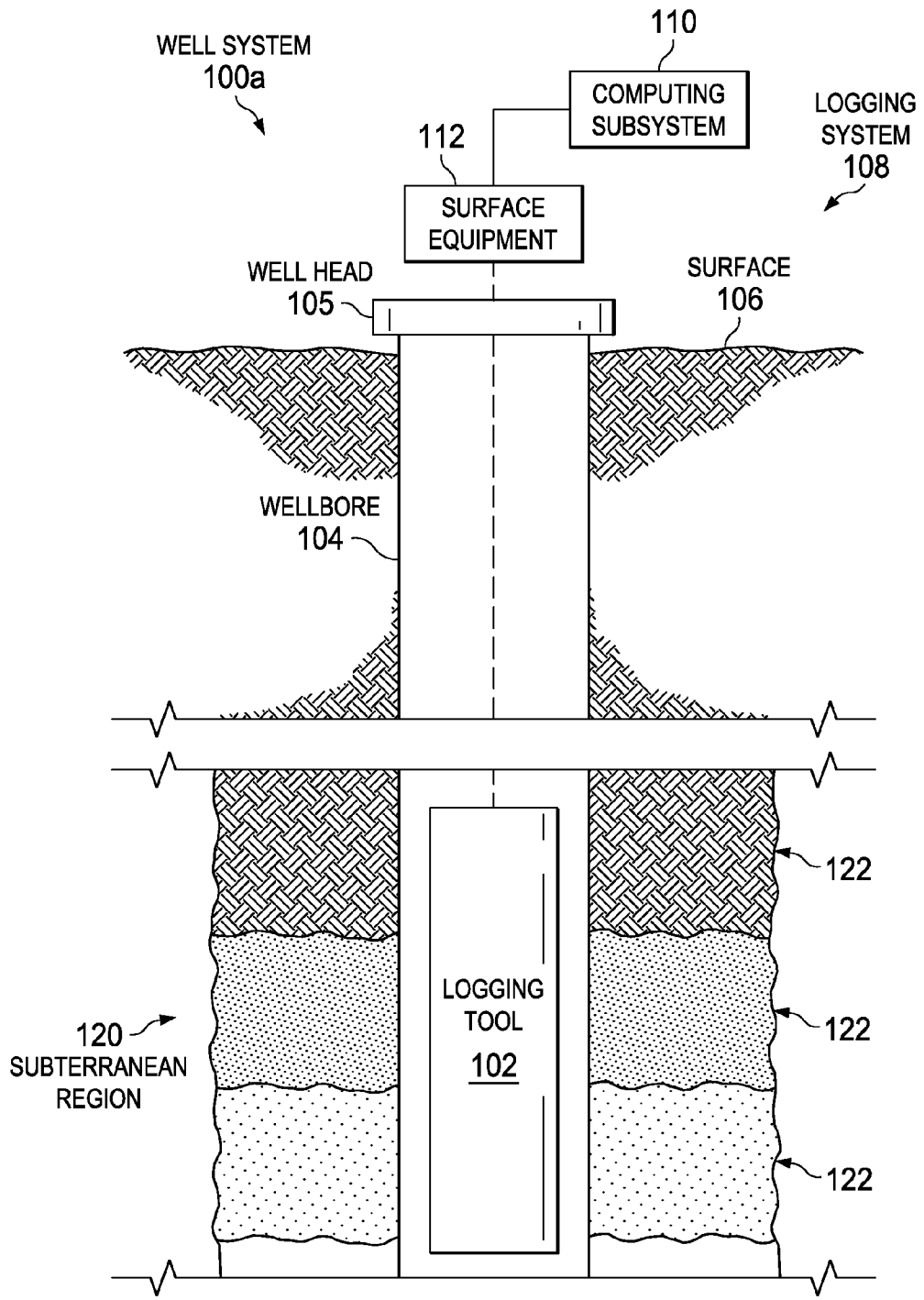
FIG. 1A is a diagram of an example well system.

Before discussing exemplary embodiments of signal generator modules, a discussion of well structures and well logging is provided. Referring to FIG. 1A, an example well system 100a includes a logging system 108 and a subterranean region 120 beneath the ground surface 106. A well system can include additional or different features that are not shown in FIG. 1A. For example, the well system 100a may include additional drilling system components, wireline logging system components, etc.

The subterranean region 120 can include all or part of one or more subterranean formations or zones. The example subterranean region 120 shown in FIG. 1A includes multiple subsurface layers 122 and a wellbore 104 penetrated through the subsurface layers 122. The subsurface layers 122 can include sedimentary layers, rock layers, sand layers, or combinations of these other types of subsurface layers. One or more of the subsurface layers can contain fluids, such as brine, oil, gas, etc. Although the example wellbore 104 shown in FIG. 1A is a vertical wellbore, the logging system 108 can be implemented in other wellbore orientations. For example, the logging system 108 may be adapted for horizontal wellbores, slant wellbores, curved wellbores, vertical wellbores, or combinations of these.

The example logging system 108 includes a logging tool 102, surface equipment 112, and a computing subsystem 110. In the example shown in FIG. 1A, the logging tool 102 is a downhole logging tool that operates while disposed in the wellbore 104. The example surface equipment 112 shown in FIG. 1A operates at or above the surface 106, for example, near the well head 105, to control the logging tool 102 and possibly other downhole equipment or other components of the well system 100. The example computing subsystem 110 can receive and analyze logging data from the logging tool 102. A logging system can include additional or different features, and the features of a logging system can be arranged and operated as represented in FIG. 1A or in another manner.

In some instances, all or part of the computing subsystem 110 can be implemented as a component of, or can be integrated with one or more components of, the surface equipment 112, the logging tool 102 or both. In some cases, the computing subsystem 110 can be implemented as one or more discrete computing system structures separate from the surface equipment 112 and the logging tool 102.

In some implementations, the computing subsystem 110 is embedded in the logging tool 102, and the computing subsystem 110 and the logging tool 102 can operate concurrently while disposed in the wellbore 104. For example, although the computing subsystem 110 is shown above the surface 106 in the example shown in FIG. 1A, all or part of the computing subsystem 110 may reside below the surface 106, for example, at or near the location of the logging tool 102.

The well system 100a can include communication or telemetry equipment that allow communication among the computing subsystem 110, the logging tool 102, and other components of the logging system 108. For example, the components of the logging system 108 can each include one or more transceivers or similar apparatus for wired or wireless data communication among the various components. For example, the logging system 108 can include systems and apparatus for wireline telemetry, wired pipe telemetry, mud pulse telemetry, acoustic telemetry, electromagnetic telemetry, or a combination of these other types of telemetry. In some cases, the logging tool 102 receives commands, status signals, or other types of information from the computing subsystem 110 or another source. In some cases, the computing subsystem 110 receives logging data, status signals, or other types of information from the logging tool 102 or another source.

Logging operations can be performed in connection with various types of downhole operations at various stages in the lifetime of a well system. Structural attributes and components of the surface equipment 112 and logging tool 102 can be adapted for various types of logging operations. For example, logging may be performed during drilling operations, during wireline logging operations, or in other contexts. As such, the surface equipment 112 and the logging tool 102 may include, or may operate in connection with drilling equipment, wireline logging equipment, or other equipment for other types of operations.

Figure 1B:
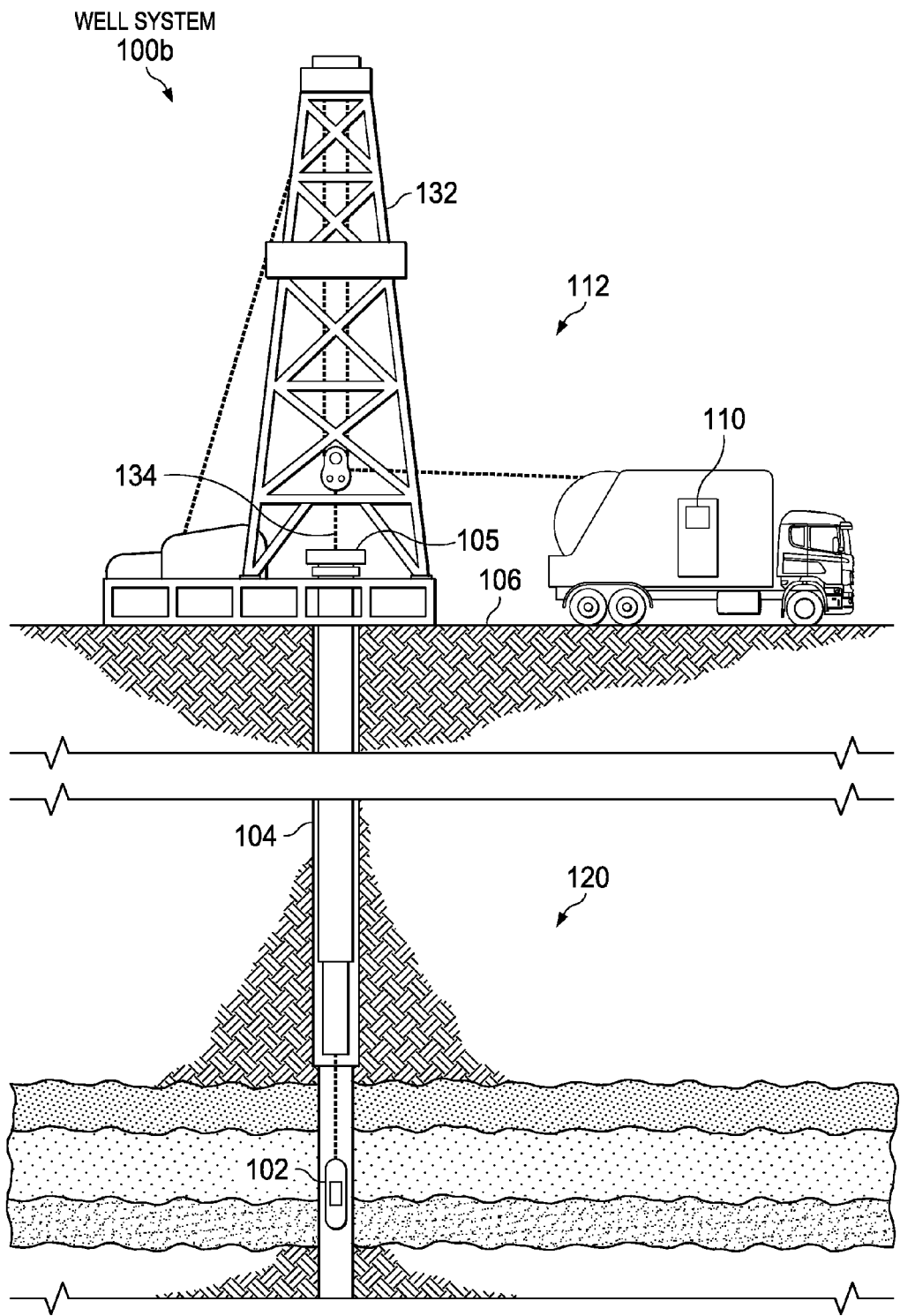
FIG. 1B is a diagram of an example well system that includes a logging tool in a wireline logging environment.

In some examples, logging operations are performed during wireline logging operations. FIG. 1B shows an example well system 100b that includes the logging tool 102 in a wireline logging environment. In some example wireline logging operations, a the surface equipment 112 includes a platform above the surface 106 is equipped with a derrick 132 that supports a wireline cable 134 that extends into the wellbore 104. Wireline logging operations can be performed, for example, after a drilling string is removed from the wellbore 104, to allow the wireline logging tool 102 to be lowered by wireline or logging cable into the wellbore 104.

Figure 1C:
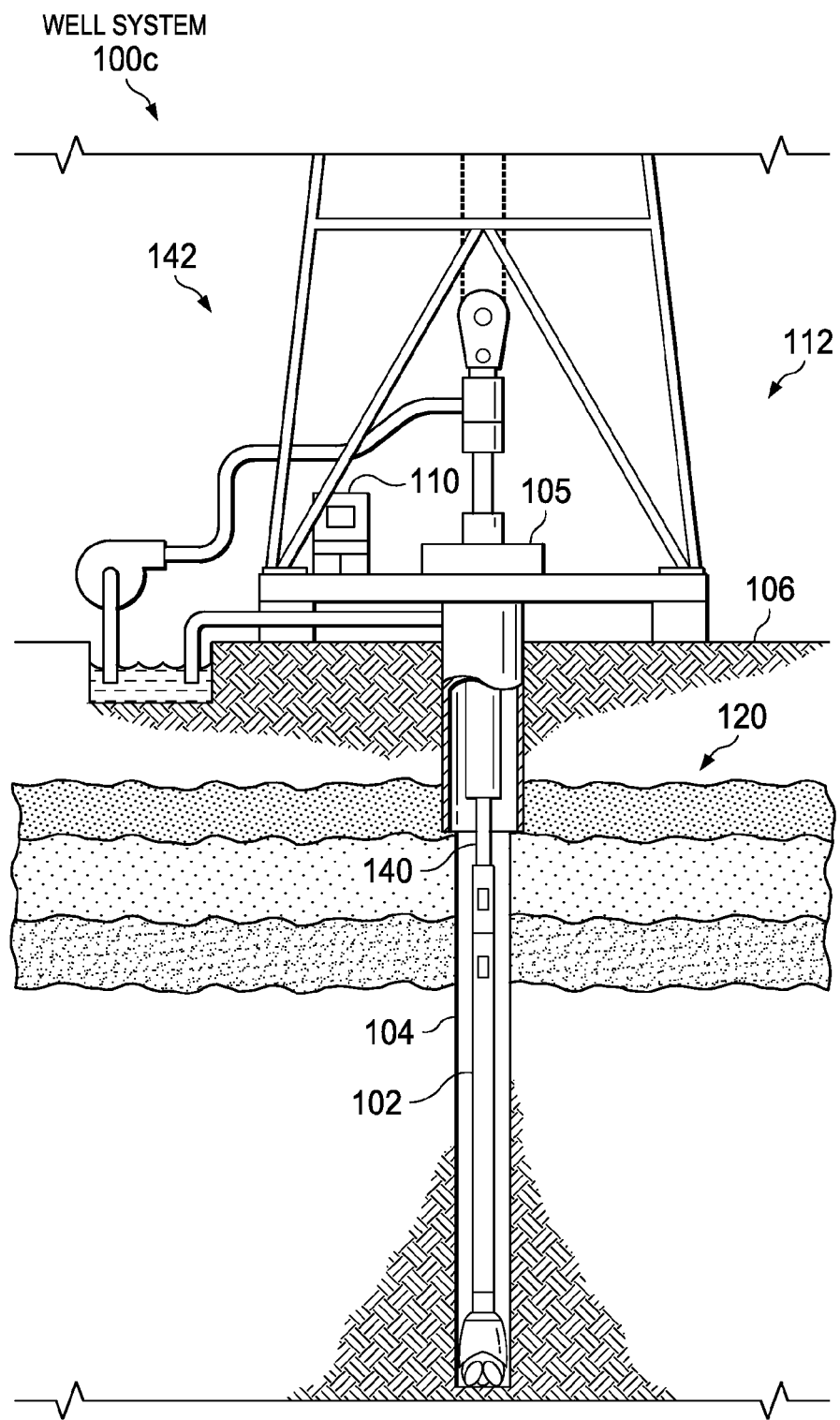
FIG. 1C is a diagram of an example well system that includes a logging tool in a logging while drilling (LWD) environment.

In some examples, logging operations are performed during drilling operations. FIG. 1C shows an example well system 100c that includes the logging tool 102 in a logging while drilling (LWD) environment. Drilling is commonly carried out using a string of drill pipes connected together to form a drill string 140 that is lowered through a rotary table into the wellbore 104. In some cases, a drilling rig 142 at the surface 106 supports the drill string 140, as the drill string 140 is operated to drill the wellbore 104 to penetrate the subterranean region 120. The drill string 140 may include, for example, a kelly, drill pipe, a bottom hole assembly, and other components. The bottom hole assembly on the drill string may include drill collars, drill bits, the logging tool 102, and other components. The logging tools may include measuring while drilling (MWD) tools, LWD tools, and others.

In some example implementations, the logging tool 102 includes a tool for obtaining measurements from the subterranean region 120. As shown, for example, in FIG. 1B, the logging tool 102 can be suspended in the wellbore 104 by a coiled tubing, wireline cable, or another structure that connects the tool to a surface control unit or other components of the surface equipment 112. In some example implementations, the logging tool 102 is lowered to the bottom of a region of interest and subsequently pulled upward (e.g., at a substantially constant speed) through the region of interest. As shown, for example, in FIG. 1C, the logging tool 102 can be deployed in the wellbore 104 on jointed drill pipe, hard wired drill pipe, or other deployment hardware. In some example implementations, the logging tool 102 collects data during drilling operations as it moves downward through the region of interest during drilling operations. In some example implementations, the logging tool 102 collects data while the drilling string 140 is moving, for example, while it is being tripped in or tripped out of the wellbore 104.

In some example implementations, the logging tool 102 collects data at discrete logging points in the wellbore 104. For example, the logging tool 102 can move upward or downward incrementally to each logging point at a series of depths in the wellbore 104. At each logging point, instruments in the logging tool 102 perform measurements on the subterranean region 120. The measurement data can be communicated to the computing subsystem 110 for storage, processing, and analysis. Such data may be gathered and analyzed during drilling operations (e.g., during logging while drilling (LWD) operations), during wireline logging operations, or during other types of activities.

The computing subsystem 110 can receive and analyze the measurement data from the logging tool 102 to detect properties of various subsurface layers 122. For example, the computing subsystem 110 can identify the density, material content, or other properties of the subsurface layers 122 based on the measurements acquired by the logging tool 102 in the wellbore 104.

During construction of a well system (e.g., well systems 100a-c), a wellbore (e.g., wellbore 104) is often drilled in proximity to one or more established wells. In some instances, an operator may wish to direct drilling away from established well structures, such that the drilling apparatus or the established well structures are not damaged by a collision. In some cases, an operator may wish to direct a drilling apparatus alongside an established well structure, such that the drilling apparatus maintains a pre-determined distance from an established structure. In some cases, an operator may wish to direct a drilling apparatus towards an established well structure, for instance during the construction of a relief well.

Figure 2:
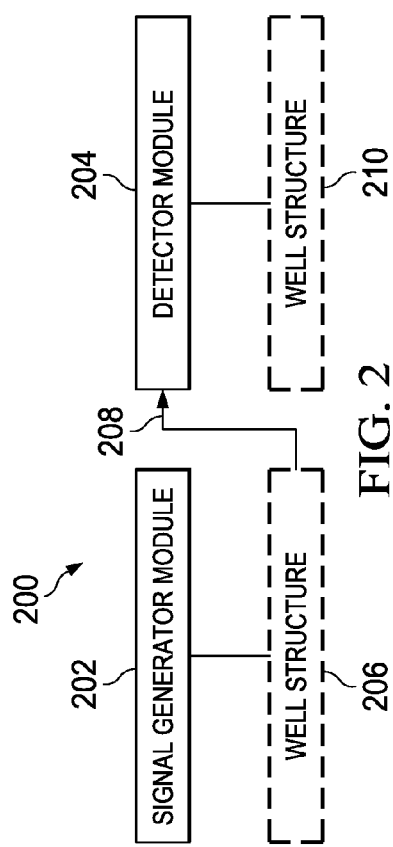
FIG. 2 is a diagram of an example well detection system.

In order to direct a drilling apparatus as desired, a well detection system is used to estimate the location of an established well relative to a well that is under construction. An example implementation of a well detection system 200 is shown in FIG. 2. Well detection system 200 includes a signal generator module 202 and a detector module 204. Signal generator module 202 is coupled to a well structure 206, and causes the well structure 206 to emit a signal 208. This signal 208 can be, for example, an electromagnetic signal such as a conducted electrical current, an electrical field (e.g., a radiating electrical field), or a magnetic field (e.g., a radiating magnetic field).

The emitted signal 208 is measured by the detector module 204. Based on measurements of the signal 208, the detector module 204 determines information pertaining to the source of the emitted signal 208. In some implementations, the detector module 204 determines the location of the well structure 206 relative to the detector module 204. For example, in some implementations, the detector module 204 determines the relative distance of well structure 206 from detector module 204, and the relative position of well structure 206 with respect to detector module 204. If detector module 204 is positioned within another well structure (e.g., within a well structure 210), the detector module 204 can provide information regarding the location of the well structure 206 relative to the well structure 210.

Signal generator module 202 and detector module 204 can be arranged such that the system 200 provides information regarding the location of one well relative to another. For example, in some implementations, well structure 206 is an established well (e.g., a well that has already been constructed), and well structure 210 is a well that is currently under construction. In this example, signal generator module 202 causes the established well structure 206 to emit signal 208, such that the location of the established well structure 206 can be determined relative to the well structure 210 currently being constructed. Based on this information, the construction of well structure 210 can be directed accordingly (e.g., by directing a drilling apparatus in a particular direction, taking into account the location of the established well structure 206). In some implementations, well structure 206 and well structure 210 are portions of the same well. For example, well structure 206 can be an already constructed portion of a well, and well structure 210 can be a portion of the same well that is currently under construction. In this example, the system 200 can be used to determine the location of one portion of a well from another portion of the same well. Based on this information, the further construction of the well can be directed accordingly.

Figure 3:
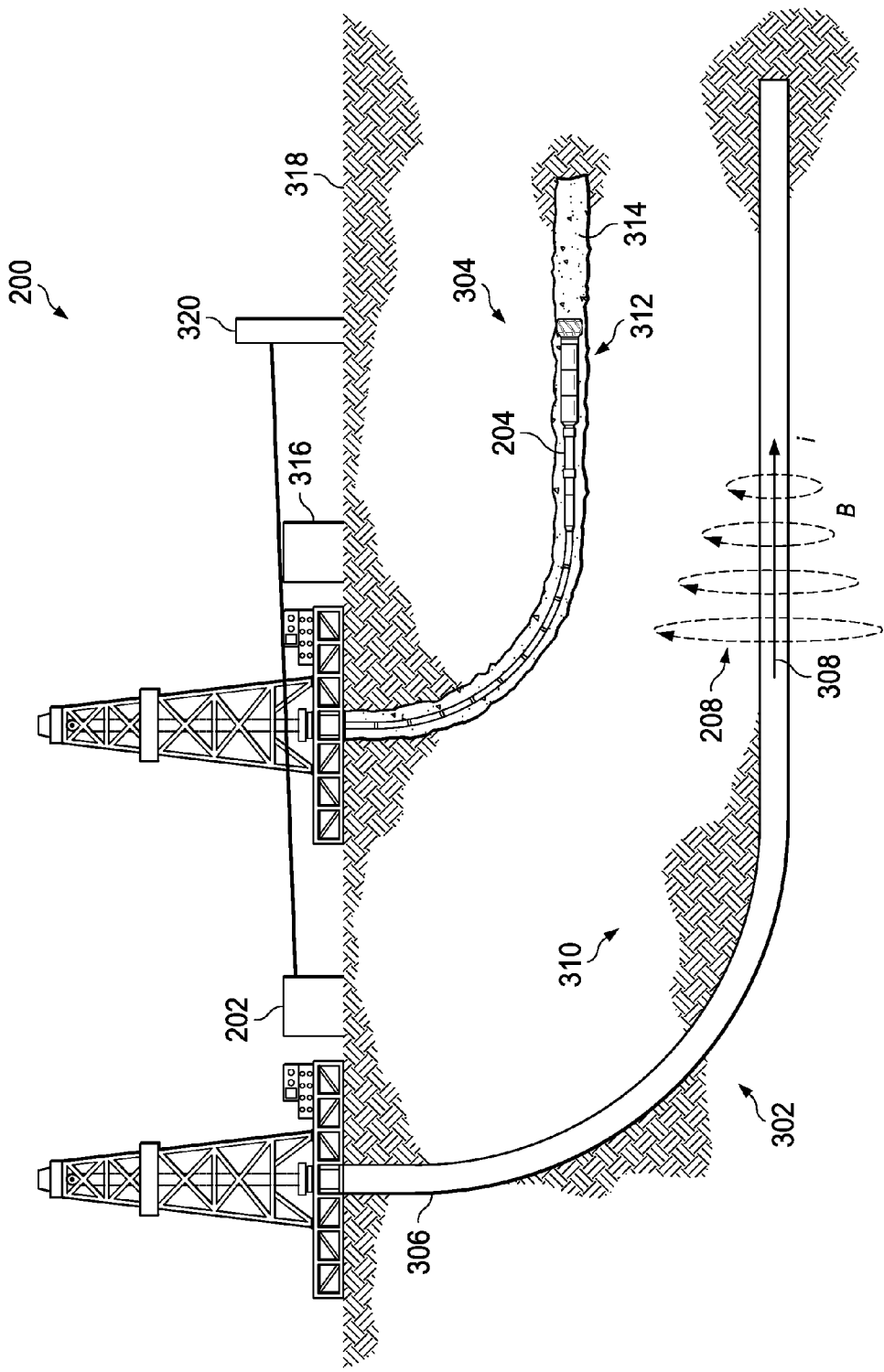
FIG. 3 is a diagram of an example implementation of a well detection system in a field that induces an established well and a second well that is under construction.

FIG. 3 shows an example implementation wherein a detection system 200 is deployed in a field that includes an established well 302 and a second well 304 that is under construction. In this example, the established well 302 includes a well casing 306. Well casing 306 provides access to underground locations below surface 318, and provides a means of transporting materials to the surface 318. Well casing 306 can vary in specification depending on its application and intended usage. Example implementations of well casing 306 used for the extraction of hydrocarbons from an underground location can extend approximately 1,500-20,000 feet below the surface 318, and can extend to 35,000 feet or beyond. In some implementations, well casing 306 is tubular with a diameter that changes as a well progresses, and can have a diameter of approximately 4.5-26 inches or larger. Well casing 306 can be made of various materials. For example, well casing 306 can be constructed of steel or another other metal or metal alloy. In some implementations, well casing 306 is electrically conductive, such that a current may be induced along its length.

Signal generator module 202 is electrically coupled to an electrically conductive portion of well 302 (e.g., well casing 306), and applies an electrical current 308 to the well 302. This electrical current 308 travels down the length of the well 302, returns via the subterranean region 310 and a remote ground stake, and induces a signal 208 in the form of a radiating magnetic field. This signal 208 radiates into the subterranean region 310 surrounding the well 302.

As shown in FIG. 3, the detector module 204 is positioned on a drilling apparatus 312. Drilling apparatus 312 is positioned within the second well 304, and is used to drill a wellbore 314 during the construction of the second well 304. As an example, the drilling apparatus 312 can be a part of a MWD or LWD system, where an operator on the surface 318 (e.g., using computing subsystem 316) directs the operation of the drilling apparatus 312 (e.g., by specifying a particular path for the drilling apparatus 312).

The signal 208 is measured by the detector module 204 in order to provide information regarding the location of the well 302 relative to the detector module 204. This information can, for example, be transmitted back to the surface 318 (e.g., to the computing subsystem 316) for review by an operator. As the detector module 204 is mounted to the drilling apparatus 312, location information determined by the detector module 204 is used to approximate the location of the well 302 relative to the drilling apparatus 312. Based on this information, the operator can direct the drilling apparatus 312 such that it drills towards the well 302, away from the well 302, parallel to the well 302, or in any other desired direction.

Detector module 204 can detect the signal 208 in a variety of ways. For example, in some implementations, detector module 204 includes one or more magnetometers that measure the strength of the signal 208 (e.g., by measuring the strength of the magnetic field at a particular point in space, for example a particular point in the subterranean region or formation). Magnetometers can include, for example, vector magnetometers (e.g., magnetometers that measure the vector components of a magnetic field at a particular point in space), or scalar magnetometers (e.g., magnetometers that measure the magnitude of the vector magnetic field at a particular point in space). In some implementations, a magnetometer either measures the absolute magnitude or vector of a magnetic field, or measures a magnitude or vector magnetic field relative to a particular baseline (e.g., relative to a standard baseline or uncalibrated baseline). In some implementations, a magnetometer can measure the strength of a magnetic field with respect one or more axes. For example, the magnetometer can be a single axis magnetometer or a three axis magnetometer that that measures the strength of the magnetic field with respect to a single axis or three axes, respectively.

Based on the magnetic field strength and/or the vector of the magnetic field measured by the magnetometer, the detector module 204 determines information regarding the source of the signal 208. Detector module 204 can determine this information, for example, using a data processing apparatus that is configured to receive measurement data from the magnetometer, interpret these measurements, and determine information regarding the source of the signal 208. For example, a magnetic field measured by the magnetometer will increase as the magnetometer approaches the source of the signal 208. Thus, as the drilling apparatus 312 approaches the well 302, the magnetic field measured by the magnetometer may increase. Based on this increase, the detector module 204 might determine that the drilling apparatus 312 is moving towards the well 302. In this manner, the detector module 204 can determine the relative distance between well 302 and well 304, and can determine the relative change in this distance during operation of the drilling apparatus 312.

In some implementations, the amount of current 308 applied to the well 302 is known. For example, in some implementations, the amount of current applied by the signal generator module 202 is known, and the conductive and resistive characteristics of the well casing 306 are known, such that the amount of current being carried by the well casing 306 at a particular point along its length can be determined. Based on this known amount of current 306, in some implementations, the detector module 204 determines the absolute distance between the detector module 204 and the well 302 (e.g., by comparing the detected magnetic field strength against the expected magnetic field strength). In some implementations, the direction of the well 302 relative to the detector module 204 is determined, for example, by measuring the vector components of the magnetic field and determining the direction of the well 302 based on these measured vector components. In this manner, the location of the well 302 relative to the detector module 204, drilling apparatus 312, and the well 304 can be determined.

Signal generator module 202 can be coupled to well 302 in a variety of ways. For example, signal generator module 202 can be positioned on or near the surface 318 and coupled to a portion of well 302, either directly or indirectly (e.g., through one or more electrical conductors such as wires, traces, or plates). In some implementations, signal generator module 202 is coupled to an above-ground portion of well 302 (e.g., a portion of well 302 that is above the surface 318), such that an operation can couple signal generator module 202 to well 302 without excavating substantially below surface 318. As an example, signal generator module 202 can be coupled to an above ground portion of well casing 306, such as a blowout preventer (e.g., a valve used to control downhole pressure in the well and to prevent materials from being blown out of the well when a blowout threatens) or other suitable portion of well casing 306. In some implementations, signal generator module 202 is reversibly attached to the well 302, such that it can be attached to the well 302 as desired (e.g., during the construction of the second well 304), then removed after use.

As described above, the electrical current 308 travels down the length of the well 302, and returns via the formation and a remote ground stake. An example of a remote ground stake 320 is shown in FIG. 3. In some implementations, signal generator module 202 can be electrically coupled to a ground stake 320 (e.g., through one or more electrical conductors such as wires, traces, or plates) that provides electrical grounding for the signal generator module 202. As current 308 travels along the length of well casing 306, the current 308 will gradually dissipate from the well casing 306, and return to the ground stake 320 through the subterranean region 310. In some implementations, the ground stake 320 is positioned close to the surface 318, for example close to the signal generator module 202 and/or the top of well 306. In some implementations, the ground stake 320 is remote from signal generator module 202 and/or the top of well 306. For example, the ground stake 320 can be positioned 10 feet, 20 feet, 30 feet, or some other distance from the signal generator module 202 and/or the top of well 306. In some implementations, the ground stake is portable, and is moved such that it is approximately vertically above the signal detector 204 as it travels through wellbore 314 of well 304. For example, referring to FIG. 3, ground stake 320 is positioned approximately vertically above the signal detector 204. As the signal detector 204 moves through the wellbore 314 (e.g., to the right), the ground stake 320 can be moved such that it remains vertically above the signal detector (e.g., to the right along the surface 318). Ground stake 320 can be moved continuously, periodically, or intermittently, depending on the implementation.

The signal generator module 202 can cause the well 302 to emit signals 208 according to different patterns. For example, in some implementations, the signal generator module 202 applies a pulsating current 308 to the well 302, such that well 302 emits a pulsating signal 208 (e.g., a pulsating magnetic field). These pulses can occur periodically, for example at a frequency of 1 Hz, 5 Hz, 10 Hz, 15 Hz, or any other frequency. In some implementations, these pulses alternates between different polarities. For example, in some implementations, the pulses alternatives between a first polarity and a second polarity opposite the first polarity. By applying pulses of current at a particular frequency and pattern, the signal 208 emitted by the well 302 will also have a particular frequency and pattern, and in some cases, can be more easily discerned by the detector module 204.

Figure 4A:
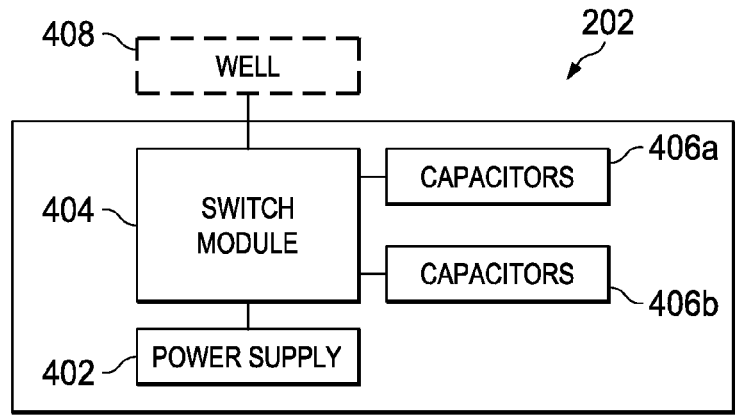
FIGS. 4A-C are diagrams of an example signal generator module.
Figure 4B:
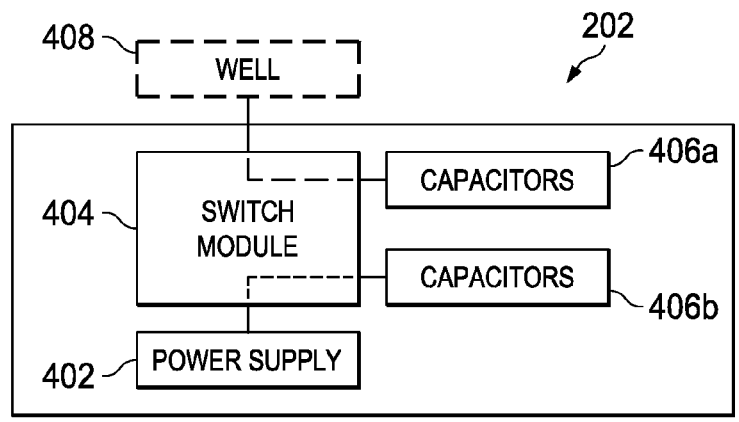

An example signal generator module 202 for applying pulses of current to a well is shown in FIG. 4A. Signal generator module 202 includes a power supply 402, a switch module 404, a first set of capacitors 406a, and a second set of capacitors 406b. Switch module 404 selectively couples the capacitors 406a-b to the power supply 402 and a well 408, such at any given moment, one of the sets of capacitors 406a-b is being charged by the power supply 402, while the other set of capacitors 406a-b is discharging electrical current into the well 408. For example, as shown in FIG. 4B, the switch module 404 can couple power supply 402 with the set of capacitors 406b (such that the set of capacitors 406b is charged by power supply 402), and couple the set of capacitors 406a to the well 408 (such that the set of capacitors 406a discharges electrical current into the well 408). As another example, as shown in FIG. 4C, the switch module 404 can couple power supply 402 with the set of capacitors 406a (such that the set of capacitors 406a is charged by power supply 402), and couple the set of capacitors 406b to the well 408 (such that the set of capacitors 406b discharges electrical current into the well 408).

Figure 4C:
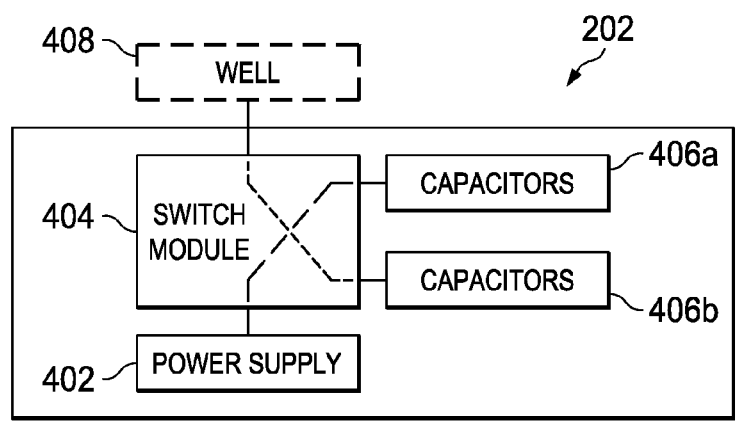

Switch module 404 can switch between the two states shown in FIGS. 4B-C periodically, such that at any given moment, one set of capacitors 406a-b is being charged by the power supply 402, while the other is discharging electrical current into the well 408. In this manner, a pulsating current is applied to a well 408, causing the well 408 to emit a pulsing magnetic field.

Figure 5A:
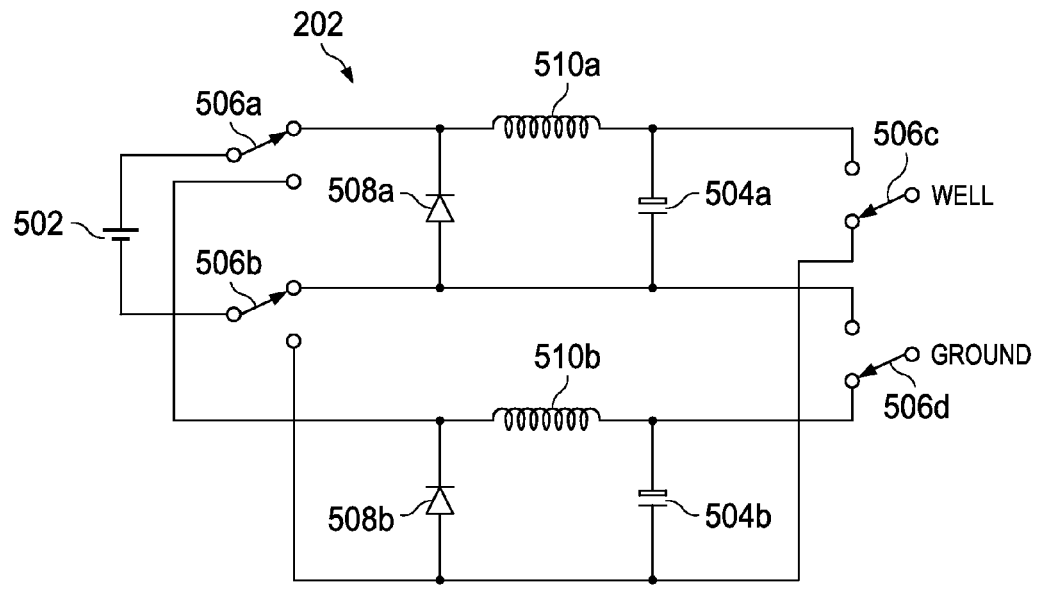
FIGS. 5A-B are diagrams of another example signal generator module.
Figure 5B:
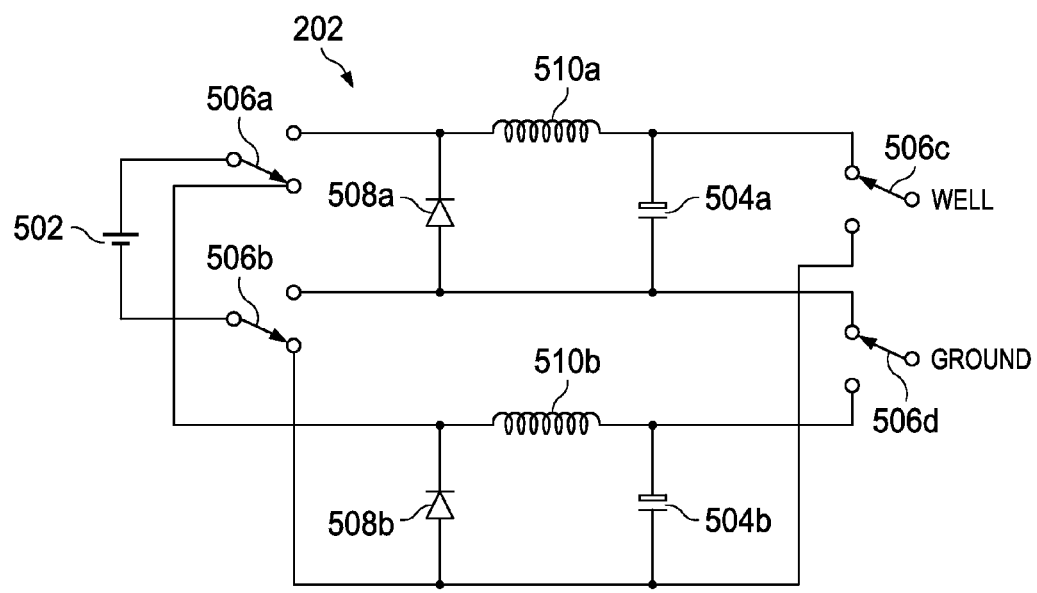

The implementation of signal module 202 shown in FIGS. 4A-C is a simplified, and is meant to illustrate how capacitors can be alternatively coupled to either the well or the power supply. In practice, signal generator module 202 can be implemented in a variety of ways. For example, as shown in FIGS. 5A-B, one example implementation of signal generator module 202 includes a DC power supply 502, two capacitors 504a-b, four switches 506a-d, two diodes 508a-b, and two inductors 510a-b. In the examples show in FIGS. 5A-B, the switches 506a-d collectively act as a switch module (e.g., a switch module having functionality similar that of switch module 404 shown in FIGS. 4A-C).

In a first state, as shown in FIG. 5A, switches 506a-b couple power supply 502 to capacitor 504a, diode 508a, and inductor 510a, forming a charging circuit that electrically charges capacitor 504a. In this state, the switches 506c-d couple the capacitor 504b, diode 508b, and inductor 510b to an electrical ground (e.g., a ground stake 320) and the well (e.g., well casing 306), forming a discharging circuit that electrically discharges capacitor 504b into the well. Diodes 508a-b act as snubbers for back electromotive force (EMF), and also maintain the current through the inductors 510a-b (e.g., when no current is flowing from the power supply).

In a second state, as shown in FIG. 5B, each of the switches 506a-d are reversed. Thus, switches 506a-b couple power supply 502 to capacitor 504b, diode 508b, and inductor 510b, forming a charging circuit that electrically charges capacitor 504b. In this state, the switches 506c-d couple the capacitor 504a, diode 508a, and inductor 510a to an electrical ground (e.g., a ground stake 320) and the well (e.g., well casing 306), forming a discharging circuit that electrically discharges capacitor 504a into the well. As above, diodes 508a-b act as snubbers for back EMF, and also maintain the current through the inductors 510a-b (e.g., when no current is flowing from the power supply).

Figure 6:
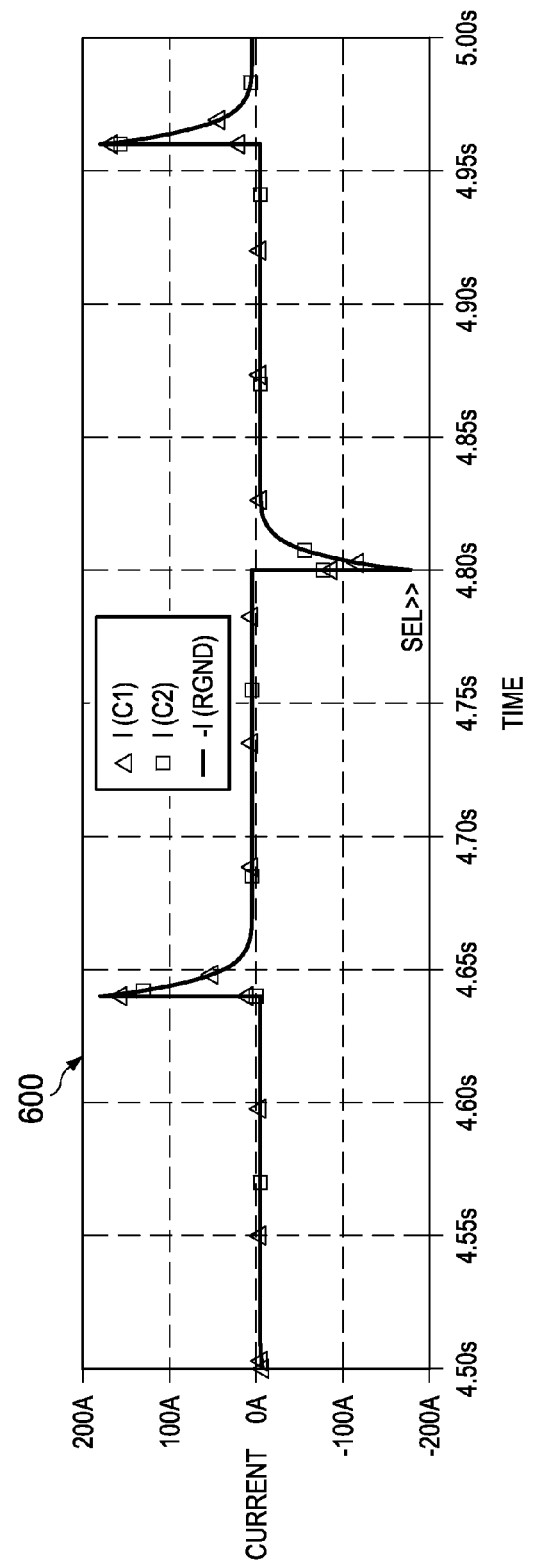
FIG. 6 is a plot of current discharged into a well by an example implementation of the signal generator module.

Due to the manner in which each of the switches 506a-d is connected to the other components, the capacitors 504a and 504b will each discharge oppositely polarized current into the well. For example, as shown in plot 600 of FIG. 6, as the switches 506a-d switch states in an alternating manner, the capacitors alternately discharge into the well. This alternating discharge of electrical current results in a current having alternately polarized peaks. Hence, as the switches 506a-d alternately switch states, an alternating magnetic field is induced about the well.

The parameters of each of the components shown above (e.g., in FIGS. 5A-B) can be modified in order to obtain the desired current, magnetic field strength, capacitor charging rate, and capacitor discharge frequency. In one example implementation, the power supply 502 has a voltage of approximately 600V, the capacitors 504a-b have a capacitance of approximately 1000 μF, and the inductors have an inductance approximately 10 H. In some implementations, this results in approximately 185 A of peak current delivered into the well at a frequency of approximately 6 Hz. Although example parameters are described above, these are merely examples. In practice, the parameters of each of the components can be modified in order to obtain other currents, magnetic field strengths, capacitor charging rates, and capacitor discharge frequencies. For example, in some implementations, given a power supply 502 having a voltage of 600 V, the capacitors 504a-b can have a capacitance between approximately 100 μF to 1000 μF, and the inductors can have an inductance between approximately 1 H and 10 H. In some implementations, this results in a peak current between approximately 1 A and 40 A delivered into the well at frequency between approximately 0.5 Hz to 30 Hz. Further, although a power supply 502 is described as having a voltage of 600 V, in practice power supplies having a higher or lower voltage can also be used, depending on the implementation. For example, in some implementations, the power supply can have a voltage of approximately 100 V to 1000 V. Other parameters values can also be used, depending on the implementation.

Alternately charging and discharging of capacitors can provide various benefits. For example, in some implementations, this arrangement allows relatively large currents to be applied to a well, and results in correspondingly strong magnetic fields that can be readily detected from adjacent wells. Further, as current is delivered by periodically charging and discharging capacitors rather than as a single continuous current, a relatively smaller power supply can be used compared to those that might be required if a large continuous current were instead applied to the well.

Figure 7:
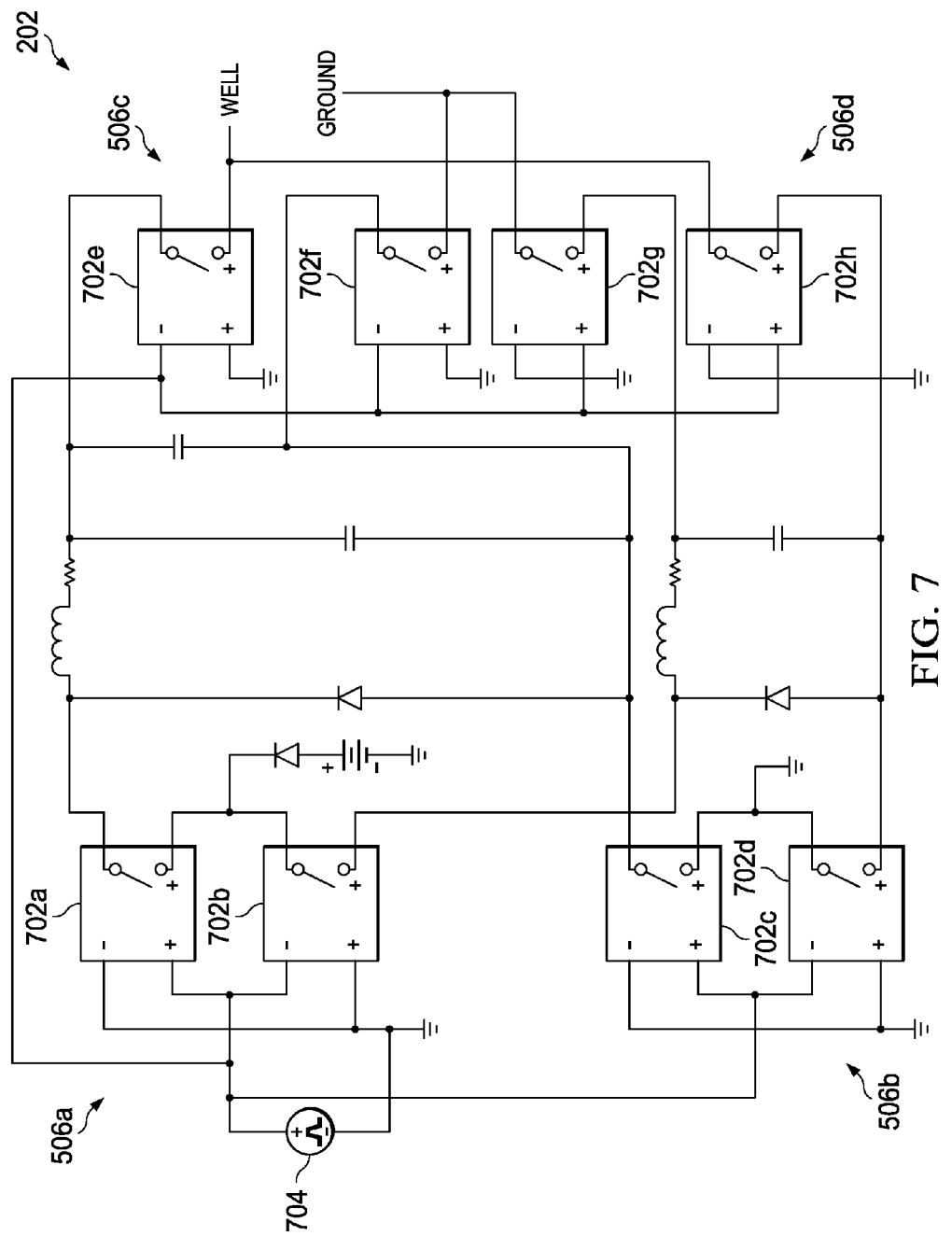
FIG. 7 is a diagram of an example implementation of a signal generator module.

Further, existing well systems often use signal modulation techniques (e.g., phase shift keying (PSK)) to transfer information to and from a downhole environment, where modulated signals are delivered by an amplifier. In some implementations, these modulation techniques are not necessary for proximity measurements, and if used for this purpose, might require a substantial amount of power and supporting equipment. For example, in some cases, in order to boost the power output of such a system such that it can be used for proximity measurements, the input power must also be boosted and a larger amplifier will be required. Implementations of the well detection system described above obviate the need for a PSK or other comparatively complicated signal system in order to make proximity measurements. Further, in some cases, an amplifier is not required, and implementations of the well location system can rely primarily on discharging capacitors into the subterranean formation to produce pulses. Therefore, implementations of the above described well detection system are comparatively more power efficient, and obviate the need for comparatively bulky equipment. In some implementations, one or more switches (e.g., switches 506a-d of FIG. 5A-B) can be each implemented as a combination of multiple switches. For example, FIG. 7 shows an example implementation of the signal generator module 202 in which switches 506a-d are each implemented by two individual switches 702a-b, 702c-d, 702e-f, and 702g-h, respectively. Switches 702a-h are controlled by a clock signal generator 704, which toggles each of the switches 702a-h synchronously based on a clock signal produced by the clock signal generator 704. Thus, during operation, the switches 702a-b, 702c-d, 702e-f, and 702g-h function in the manner shown in FIGS. 5A-B with respect to switches 506a, 506b, 506c, and 506d, respectively. Although one example implementation is shown in FIG. 7, other implementations are also possible.

The switches 506a-d and 702a-h can be implemented in a variety of ways. For example, the switches 506a-d and/or 702a-h can be conventional relays, solid state relays, metal-oxide-semiconductor field-effect transistors (MOSFETs), junction gate field-effect transistors (JFETs), insulated-gate-field-effect transistor (IGFETs), insulated-gate bipolar transistor (IGBTs), thyristors, triacs, or any other suitable switching device.

Figure 8:
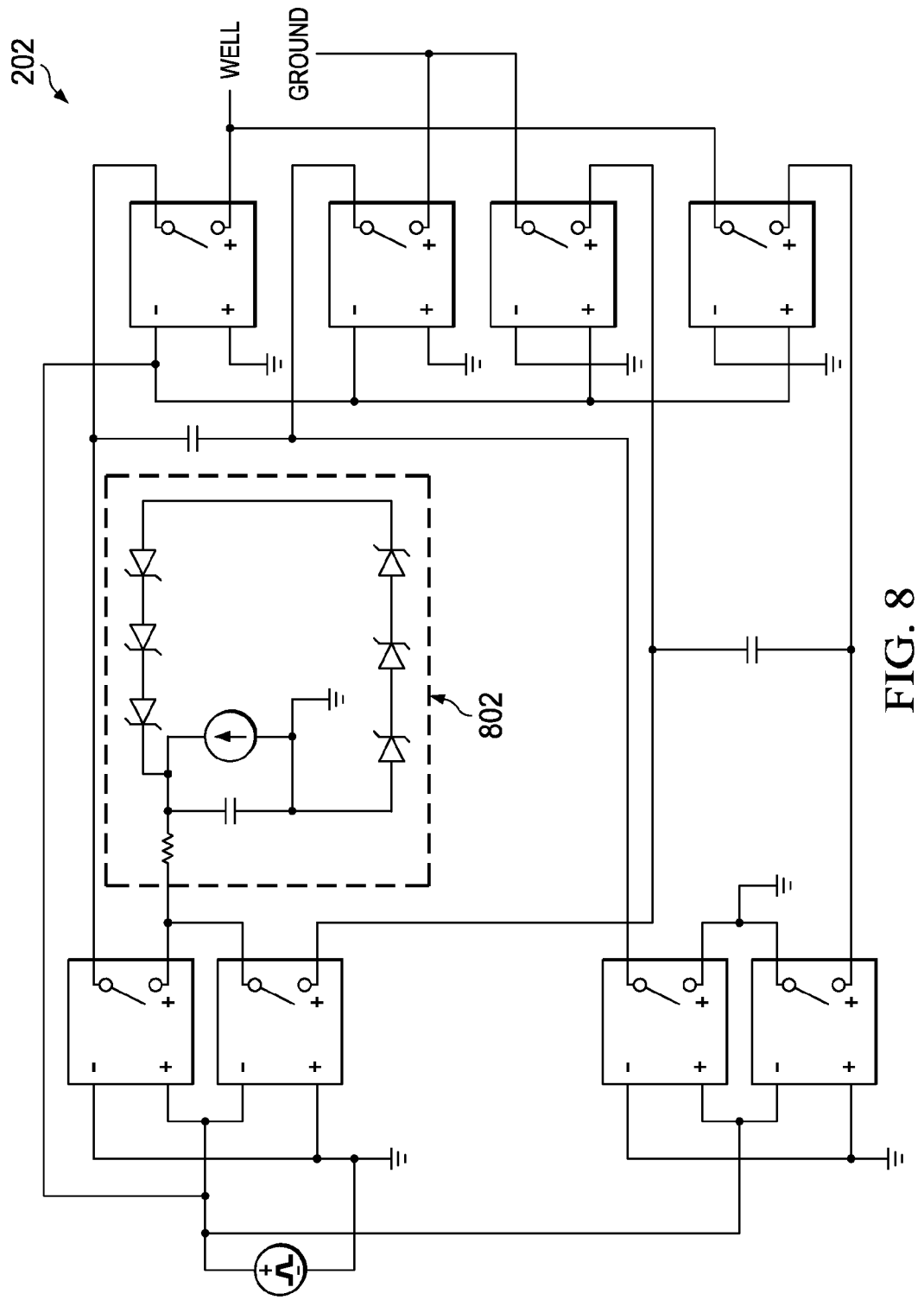
FIG. 8 is a diagram of an example implementation of a signal generator module that includes a constant current source.

In some implementations, various components of the signal generator module 202 can be replaced by one or more integrated components. For example, FIG. 8 shows an example implementation of the signal generator module 202 in which the DC power supply, inductors, and didoes are replaced with a current limited power supply 802. This power supply 802 can be operated, for example, in constant current mode, providing output voltages and power in the desired range. For example, in some implementations, power supply 802 can have an output voltage of approximately 600 V and power of up to 15 kW, with the current limited accordingly.

Some implementations described in this specification can be implemented as one or more groups or modules of digital electronic circuitry, computer software, firmware, or hardware, or in combinations of one or more of them. For example, the computer subsystems 110 and 316, signal generator module 202, and detector module 204 can be implemented, either partially or completely, as one or more groups or modules of digital electronic circuitry, computer software, firmware, or hardware, or in combinations of one or more of them. While different modules are described, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In some implementations, a computer system can be used to implement, or otherwise control, all or part of a computer subsystem (e.g., the computer subsystems 110 and 316), a signal generator module (e.g., the signal generator module 202), a detector module (e.g., the detector module 204), or combinations thereof. For instance, referring to the well detection system 200 shown in FIG. 2, the signal generator module 202 can include one or more computer systems that control its operation (e.g., to control the generation and application of electrical current to well structure 206), and the detector module 204 can include one or more computer systems that interpret the signal detected by the detector module 204 (e.g., to determine the location of well structure 206 relative to well structure 210 based on detected magnetic field pulses). As an example, one or more computer systems can determine the relative distance between two well structures by determining a relative change in the strength of magnetic field pulses detected by the detector module 204 during a drilling operation. As another example, one or more computer systems can determine the absolute distance between two well structures by comparing the strength of magnetic field pulses detected by the detector module 204 to the expected magnetic field strength (given certain known or predicted operational parameters).

While this specification contains many details, these should not be construed as limitations on the scope of what may be claimed, but rather as descriptions of features specific to particular examples. For example, while various implementations of a signal generator module are shown having two capacitors or two sets of capacitors, in practice, a greater number of capacitors can be used. For example, in some implementations, three or more sets of capacitors, each set having one or more capacitors, can be used to deliver current into a well. In these implementations, the operation of the switches can be configured such that at any given time, at least one set of capacitors is discharging current into the well, and at least one set of capacitors is being charged.

In some implementations, the capacitors need not be fully charged and discharged, and can instead be discharged after being partially charged and/or charged after being partially discharged. This can be beneficial in certain circumstances, for example if it is desired to increase the frequency of charging and discharging.

In some implementations, a signal generator module can include one or more diodes can be used to reduce or eliminate resonance phenomena. For example, referring to the signal generator module 202 shown in FIGS. 5A-B, a diode can be placed in series with the power supply 502 with its anode at the positive end of the power supply 502, and the cathode at the circuit end. In addition to reducing or eliminating resonance phenomena, the one or more diodes can also provide protection for the circuit elements of the signal generator module 202 against the effects reverse voltage. Further, the use of a diode allows the capacitors (e.g., the capacitors 504*a-b*) to be charged up to twice the voltage volume of the power supply 502. This allows the output voltage to be twice that of the power supply 502, or alternatively allows the power supply voltage to be reduced by one half to obtain the same voltage output.

Further, certain features that are described in this specification in the context of separate implementations can also be combined. Conversely, various features that are described in the context of a single implementation can also be implemented in multiple embodiments separately or in any suitable subcombination.

Various aspects of the invention are summarized as follows.

In general, in an aspect, a method for locating a first well structure relative to a second well structure includes alternately charging a first set of capacitors while discharging a second set of capacitors into the first well structure, and discharging the first set of capacitors into the first well structure while charging the second set of capacitors. The method also includes detecting, from the second well structure, magnetic field pulses corresponding to the discharging of the first and second sets of capacitors into the first well structure. The method also includes determining information pertaining to a location of the first well structure relative to the second well structure based on the detected magnetic field pulses.

Implementations of this aspect may include one or more of the following features:

In some implementations, the method can be performed during the construction of the second well. Detecting the detecting the magnetic field pulses can include obtaining measurements from a magnetometer disposed on a drilling apparatus within the second well structure.

In some implementations, discharging the first or second sets of capacitors can include discharging the first or second sets of capacitors into an electrically conductive portion of the first well structure.

In some implementations, discharging the first or second sets of capacitors can include discharging the first or second sets of capacitors into an above-ground portion of the first well structure.

In some implementations, discharging the first or second sets of capacitors can include discharging the first or second sets of capacitors into a blowout preventer of the first well structure.

In some implementations, the magnetic field pulses can include a first set of magnetic field pulses corresponding to the discharging of the first set of capacitors and a second set of magnetic field pulses corresponding to the discharging of the second set of capacitors, where the first set of magnetic field pulses has a polarity opposite that of the second set of magnetic field pulses.

In some implementations, the discharging the first or second sets of capacitors can induce an electrical current on the first well structure, where the electrical current has a return path through a subterranean region surrounding the first well structure to a ground stake positioned on a surface of the earth. The method can also include moving the ground stake along the surface of the earth such that the ground stake is vertically above the magnetometer as the drilling apparatus moves within the second well structure.

In general, in another aspect, a system includes a signal generator module coupled to a first well structure. The signal module includes a first set of capacitors, a second set of capacitors, a power supply, a switch module. The switch module is configured to alternately charge the first set of capacitors with the power supply while discharging the second set of capacitors into the first well structure, and discharge the first set of capacitors into the first well structure while charging the second set of capacitors with the power supply. The system also includes a detector module disposed within a second well structure. The detector module includes a magnetometer for detecting magnetic field pulses corresponding to the discharging of the first and second sets of capacitors into the first well structure, and a processing apparatus configured to determine information pertaining to a location of the first well structure relative to the second well structure based on the detected magnetic field pulses.

Implementations of this aspect may include one or more of the following features:

In some implementations, the detector module can be disposed on a drilling apparatus within the second well structure.

In some implementations, the signal generator module can be coupled to an electrically conductive portion of the first well structure, where the switch module is configured to discharge the first or second sets of capacitors into the electrically conductive portion of the first well structure.

In some implementations, the signal generator module can be coupled to an above-ground portion of the first well structure, where the switch module is configured to discharge the first or second sets of capacitors into the above-ground portion of the first well structure.

In some implementations, the signal generator module can be coupled to a blowout preventer of the first well structure, where the switch module is configured to discharge the first or second sets of capacitors into the blowout preventer of the first well structure.

In some implementations, the magnetic field pulses can include a first set of magnetic field pulses corresponding to the discharging of the first set of capacitors and a second set of magnetic field pulses corresponding to the discharging of the second set of capacitors, where the first set of magnetic field pulses has a polarity opposite that of the second set of magnetic field pulses.

In some implementations, the signal generator module can be coupled to a ground stake on a surface of the earth, where current induced on the first well structure by the discharging of the first or second sets of capacitors returns through a subterranean region surrounding the first well structure to a ground stake. The ground stake can be positioned vertically above the magnetometer. The ground stake can be moveable and capable of remaining vertically above the magnetometer as the drilling apparatus moves within the second well structure.

A number of examples have been described. Nevertheless, it will be understood that various modifications can be made. Accordingly, other implementations are within the scope of the following claims.

What is claimed is:

1. A method for locating a first well structure relative to a second well structure, the method comprising:
   alternately charging a first set of capacitors while discharging a second set of capacitors into the first well structure, and discharging the first set of capacitors into the first well structure while charging the second set of capacitors;
   detecting, from the second well structure, magnetic field pulses corresponding to the discharging of the first and second sets of capacitors into the first well structure;

determining information pertaining to a location of the first well structure relative to the second well structure based on the detected magnetic field pulses.

2. The method of claim 1, wherein the method is performed during the construction of the second well.

3. The method of claim 2, wherein detecting the magnetic field pulses comprises obtaining measurements from a magnetometer disposed on a drilling apparatus within the second well structure.

4. The method of claim 1, wherein discharging the first or second sets of capacitors comprises discharging the first or second sets of capacitors into an electrically conductive portion of the first well structure.

5. The method of claim 1, wherein discharging the first or second sets of capacitors comprises discharging the first or second sets of capacitors into an above-ground portion of the first well structure.

6. The method of claim 1, wherein discharging the first or second sets of capacitors comprises discharging the first or second sets of capacitors into a blowout preventer of the first well structure.

7. The method of claim 1, wherein the magnetic field pulses comprises a first set of magnetic field pulses corresponding to the discharging of the first set of capacitors and a second set of magnetic field pulses corresponding to the discharging of the second set of capacitors, wherein the first set of magnetic field pulses has a polarity opposite that of the second set of magnetic field pulses.

8. The method of claim 3, wherein the discharging the first or second sets of capacitors induces an electrical current on the first well structure, wherein the electrical current has a return path through a subterranean region surrounding the first well structure to a ground stake positioned on a surface of the earth.

9. The method of claim 8, further comprising moving the ground stake along the surface of the earth such that the ground stake is vertically above the magnetometer as the drilling apparatus moves within the second well structure.

10. A system comprising:
  a signal generator module coupled to a first well structure, the signal module comprising:
    a first set of capacitors;
    a second set of capacitors;
    a power supply; and
    a switch module configured to alternately charge the first set of capacitors with the power supply while discharging the second set of capacitors into the first well structure, and discharge the first set of capacitors into the first well structure while charging the second set of capacitors with the power supply;
  a detector module disposed within a second well structure, the detector module comprising:
    a magnetometer for detecting magnetic field pulses corresponding to the discharging of the first and second sets of capacitors into the first well structure; and
    a processing apparatus configured to determine information pertaining to a location of the first well structure relative to the second well structure based on the detected magnetic field pulses.

11. The system of claim 10, wherein the detector module is disposed on a drilling apparatus within the second well structure.

12. The system of claim 10, wherein the signal generator module is coupled to an electrically conductive portion of the first well structure, and wherein the switch module is configured to discharge the first or second sets of capacitors into the electrically conductive portion of the first well structure.

13. The system of claim 10, wherein the signal generator module is coupled to an above-ground portion of the first well structure, and wherein the switch module is configured to discharge the first or second sets of capacitors into the above-ground portion of the first well structure.

14. The system of claim 10, wherein the signal generator module is coupled to a blowout preventer of the first well structure, and wherein the switch module is configured to discharge the first or second sets of capacitors into the blowout preventer of the first well structure.

15. The system of claim 10, wherein the magnetic field pulses comprises a first set of magnetic field pulses corresponding to the discharging of the first set of capacitors and a second set of magnetic field pulses corresponding to the discharging of the second set of capacitors, wherein the first set of magnetic field pulses has a polarity opposite that of the second set of magnetic field pulses.

16. The system of claim 11, wherein the signal generator module is coupled to a ground stake on a surface of the earth, wherein current induced on the first well structure by the discharging of the first or second sets of capacitors returns through a subterranean region surrounding the first well structure to a ground stake.

17. The system of claim 16, wherein the ground stake is positioned vertically above the magnetometer.

18. The system of claim 17, wherein the ground stake is moveable and capable of remaining vertically above the magnetometer as the drilling apparatus moves within the second well structure.

* * * * *